United States Patent [19]

Smyser et al.

[11] Patent Number: 4,963,627
[45] Date of Patent: Oct. 16, 1990

[54] INJECTION MOLDABLE BLENDS OF POLY(ETHERKETONES) AND POLYAMIDE-IMIDES

[75] Inventors: Granville L. Smyser, Plainfield; Gary T. Brooks, Naperville, both of Ill.

[73] Assignee: Amoco Corporation, Chicago, Ill.

[21] Appl. No.: 291,966

[22] Filed: Dec. 30, 1988

[51] Int. Cl.$^5$ .............................................. C08L 77/00
[52] U.S. Cl. .................................... 525/420; 525/419
[58] Field of Search ........................................ 525/420

[56] References Cited

U.S. PATENT DOCUMENTS

| | | |
|---|---|---|
| T103,703 | 12/1983 | Colquhoun et al. |
| 3,441,538 | 4/1969 | Marks |
| 3,442,857 | 5/1969 | Thornton |
| 3,494,890 | 2/1970 | Morello |
| 3,516,966 | 6/1970 | Berr |
| 3,953,400 | 4/1976 | Dahl |
| 4,016,140 | 4/1977 | Morello |
| 4,136,085 | 1/1979 | Hanson |
| 4,176,222 | 11/1979 | Cinderey et al. |
| 4,224,214 | 9/1980 | Chen |
| 4,396,755 | 8/1983 | Rose |
| 4,398,020 | 8/1983 | Rose |
| 4,403,061 | 6/1983 | Brooks et al. |
| 4,640,944 | 2/1987 | Brooks |
| 4,684,674 | 8/1987 | Brooks |

FOREIGN PATENT DOCUMENTS 0184254  10/1984  Japan ................................ 525/420

OTHER PUBLICATIONS

Ketimine Modifications as a Route to Novel and Derived Semicrystalline Poly(arylene Ether Ketone) Homo- and Copolymers (Mohanty, D. K., Lowery, R. C., Lyle, G. D., McGrath, J. E.) Department of Chemistry and Polymer Materials and Interfaces Laboratory (Virginia Polytechnic Institute and State University), 32nd International SAMPE Symposium-apr. 6-9, 1987, pp. 408-419.

*Primary Examiner*—John C. Bleutge
*Assistant Examiner*—Vasu S. Jagannathan
*Attorney, Agent, or Firm*—William H. Magidson; Ralph C. Medhurst

[57] ABSTRACT

This invention relates to blends of amide-imide polymer or amide-imide-phthalamide polymer and polyaryletherketones which include an inorganic hydrate to stabilize the melt viscosity of the polymer blend. The invention also relates to a composition and a molded article.

30 Claims, No Drawings

INJECTION MOLDABLE BLENDS OF POLY(ETHERKETONES) AND POLYAMIDE-IMIDES

RELATED APPLICATION

This application contains disclosure related to that of U.S. patent application Ser. No. 291,967, filed of even date herewith, entitled "Miscible Blends of Imide Containing Polymers with Polyarylsulfones".

FIELD OF THE INVENTION

The invention relates to blends of amide-imide polymer or amide-imide-phthalamide polymer and polyaryletherketone and which can be molded with inorganic hydrates using conventional techniques.

BACKGROUND OF THE INVENTION

Polyamide-imide or polyamide-imide-phthalamides and polyaryletherketone blends yield mixtures that have two different glass transition temperatures, i.e., are immiscible. In the field of miscibility or compatibility of polymer blends, the prior art has found predictability to be unattainable, even though considerable work on the matter has been done. According to the authorities:

(A) "It is well known that compatible polymer blends are rare". Wang and Cooper, Journal of Polymer Science, Polymer Physics Edition, Vol. 21, p. 11 (1983).

(B) "Miscibility in polymer-polymer blends is a subject of widespread theoretical as well as practical interest currently. In the past decade or so, the number of blend systems that are known to be miscible has increased considerably. Moreover, a number of systems have been found that exhibit upper and lower critical solution temperatures, i.e., complete miscibility only in limited temperature ranges. Modern thermodynamic theories have had limited success to date in predicting miscibility behavior in detail. These limitations have spawned a degree of pessimism regarding the likelihood that any practical theory can be developed that can accommodate the real complexities that nature has bestowed on the polymer-polymer interactions." Kambour, Bendler, Bopp, Macromolecules, 16, 753 (1983).

(C) "The vast majority of polymer pairs form two-phase blends after mixing as can be surmised from the small entropy of mixing for very large molecules. These blends are generally characterized by opacity, distinct thermal transitions, and poor mechanical properties. However, special precautions in the preparation of two-phase blends can yield composites with superior mechanical properties. These materials play a major role in the polymer industry, in several instances commanding a larger market than either of the pure components." Olabisi, Robeson, and Shaw, Polymer-Polymer Miscibility, Academic Press, New York, N.Y., p. 7 (1979).

(D) "It is well known that, regarding the mixing of the thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty; for example, see P. J. Flory, Principles of Polymer Chemistry, Cornell University Press, 1953, Chapter 13, p. 555." Younes, U.S. Pat. No. 4,371,672.

(E) "The study of polymer blends has assumed an ever increasing importance in recent years and the resulting research effort has led to the discovery of a number of miscible polymer combinations. Complete miscibility is an unusual property in binary polymer mixtures which normally tend to form phase-separated systems. Much of the work has been of a qualitative nature, however, and variables such as molecular weight and conditions of blend preparation have often been overlooked. The criteria for establishing miscibility are also varied and may not always all be applicable to particular systems." Saeki, Cowie and McEwen, Polymer, vol. 25, p. 60 (January 1983).

Thus, miscible or compatible polymer blends are not common. The criteria for determining whether or not two polymers are miscible are now well established. According to Olabisi et al., Polymer-Polymer Miscibility, supra p. 120, "The most commonly used method for establishing miscibility in polymer-polymer blends or partial phase mixing in such blends is through determination of the glass transition (or transitions) in the blend versus those of the unblended constituents. A miscible polymer blend will exhibit a single glass transition between the Tg's of the components with a sharpness of the transition similar to that of the components In cases of border line miscibility broadening of the transitions will occur. With cases of limited miscibility, two separate transitions between those of the constituents may result, depicting a component 1-rich phase and a component 2-rich phase. In cases where strong specific interactions occur, the Tg may go through a maximum as a function of concentration. The basic limitation of the utility of glass transition determinations in ascertaining polymer-polymer miscibility exists with blends composed of components which have equal or similar (20° C. difference) Tg's, whereby resolution by the techniques to be discussed of two Tg's is not possible."

W. J. MacKnight et al., in Polymer Blends, D. R. Paul and S. Newman, p. 188, Academic press, New York, NY. (1978) state:

"Perhaps the most unambiguous criterion of polymer compatibility is the detection of a single glass transition whose temperature is intermediate between those corresponding to the two component polymers."

In this passage, it is clear that by compatibility the authors mean miscibility, i.e., single phase behavior. See, for example, the discussion in Chapter 1 by D.R. Paul in the same work. The above references and related application are hereby incorporated by reference.

Based on applicants' knowledge, the prior art has failed to teach how to stabilize the melt viscosity of immiscible blends of this invention to avoid encountering an increase of the melt viscosity of the blend while it is being molded, for example, by injection molding. Applicants have discovered how to overcome a problem unsolved by the prior art for the subject blends and have discovered that products formed from them have improved physical properties compared to polyamide-imide products not alloyed with polyaryletherketones.

SUMMARY OF THE INVENTION

The invention relates to a process for stabilizing the melt viscosity of a polymer blend comprising mixing polyamide-imide or polyamide-imide-phthalamide and polyaryletherketone with a hydrate which liberates water of hydration at temperatures above melt flow temperatures of polyamide-imide or polyamide-imide-phthalamide, but below melting points for polyaryletherketone and recovering a product.

The invention also relates to a polymer compound comprising polyamide-imide or polyamide-imide-phthalamide, polyaryletherketone and hydrate which liberates water of hydration at temperatures above melt flow temperatures of polyamide-imide or polyamide-imide-phthalamide, but below melting points for polyaryletherketone.

The invention also relates to a molded article comprising polyamide-imide or polyamide-imide-phthalamide, polyaryletherketone and hydrate which liberates water of hydration at temperatures above melt flow temperatures of polyamide-imide or polyamide-imide-phthalamide, but below melting points for polyaryletherketone.

DETAILED DESCRIPTION OF THE INVENTION

It has been observed that polyamide-imide (PAI) or polyamide-imide-phthalamides (PAIP) and polyaryletherketones (PAEK), such as polyetherketone (PEK) or polyetheretherketone (PEEK) or other polyaryletherketones that have varying levels of ether to ketone in the repeat unit, yield a polymer blend that has two different glass transition temperatures. Heretofore, this blend has not been processed by injection molding using inorganic hydrates.

For thermoplastic polymers and blends thereof, it is necessary that the material exhibits good melt processability to have commercial utility. A material is extremely market limited if it can not be processed using conventional injection molding techniques. Because of grafting between the two polymer blend components, which results in a high melt viscosity during injection molding, blends of PAI and PEEK can not be melt processed. Applicants have found that grafting can be controlled by the incorporation of select hydrates which liberate water during processing to prevent polycondensation between the components. However, after molding, grafting is beneficial to improve properties. Thus, the ideal additive is one that inhibits grafting during molding while promoting grafting during annealing or curing.

In attempts to mold PAI and PEEK alone, applicants encountered an increase in the melt viscosity of the blend in the barrel of an injection molding press. Applicants have discovered that at the melt temperatures necessary to mold the blend, the highly reactive PAI grafts with the PEEK. Applicants have further discovered that by adding inorganic hydrate to the blend, they can process the blend using a variety of injection molting conditions The principle behind this invention is to stabilize melt viscosity of the PAI/PAEK blend and PAIP/PAEK blend or mixtures thereof so that it can be injection molded If not stabilized at the temperature necessary to process the PAI/PAEK blend or the PAIP/PAEK blend, the melt viscosity increases to such an extent that the blend cannot be processed Applicants believe that the increase in melt viscosity is due to grafting or crosslinking between the PAI or PAIP and the PAEK. Applicants believe that where free amine groups such as are available with PAI or with PAIP and ketone groups such as are available with PAEK, the components react to form a ketimine functional group between the functional groups liberating water during condensation. See D.K. Mohanty, *Ketimine Modifications as a Route to Novel Amphorous and Derived Semi-Crystalline Poly(aryletherketones) Homo and Copolymers*, 32nd International SAMPE Symposium, pp. 408–419 (April 1987), hereby incorporated by reference. Applicants further believe that it is possible to inhibit the apparent ketimine reaction by the addition of a thermally liable inorganic hydrate, inhibiting or partially inhibiting condensation from occurring during molding. Applicants have found that by selecting an appropriate hydrate, one that can liberate water of hydration at temperatures above the melt flow temperature ($T_g$) of the PAI or PAIP, but below the melting point ($T_m$) of PAEK, it is possible to inhibit the apparent ketimine reaction during molding. Note that the hydrate can liberate water at other temperatures but this has not been found to affect the moldability of the blend. This inhibition occurs because the polycondensation reaction is an equilibrium process. After molding, the hydrate modified blend of PAI/PAEK or PAIP/PAEK can be solid state polymerized, driving off the chemically liberated water due to polycondensation of the PAI or PAIP and PAEK, forming a ketimine linkage between the matrixes. Also, during solidstate polymerization, the PAI polymer or PAIP polymer can undergo further imidization and chain extension, resulting in further improvement in physical properties. Similarly, the PAEK can undergo crystallization, also resulting in further improvements in physical properties.

The molded articles according to blends of this invention have superior properties to PEEK in tensile strength, flexural strength, flexural modulus and heat deflection temperature. In general, the articles are tougher than PAI having higher tensile elongations. Also, the blends can be processed utilizing conventional molding techniques, in particular, injection molding without special equipment required for PAI or PAIP alone. Moreover, the blends of this invention can be cured on a much shorter cure cycle than PAI or PAIP alone. The disclosed PAI and PAIP requires curing to increase molecular weight, resulting in significant property increases as discussed in U.S. Pat. Nos. 4,684,674 (Tables I) and 4,640,944 (Tables 1 and 3), both hereby incorporated by reference.

As mentioned, the blends according to this invention contain three essential components: polyamide-imide or polyamide-imide-phthalamide, polyaryletherketone, and inorganic hydrate. These will be discussed below.

The amide-imide copolymers of this invention are prepared by reacting an acyl halide derivative of an aromatic tricarboxylic-acid-anhydride with two or more of a mixture of largely- or wholly-aromatic primary diamines. The resulting products are polyamides and polyamic acids wherein the linking groups are predominantly amide groups, although some may be imide groups, and wherein the structure contains free carboxylic acid groups which are capable of further reaction. These polyamide-imide copolymers can be made in accordance with the disclosures and teachings in U.S. Pat. No. 4,136,085 which is incorporated herein by reference. Such polyamides are moderate molecular weight (7–13,000 as prepared) polymeric compounds having, in their molecule. units of:

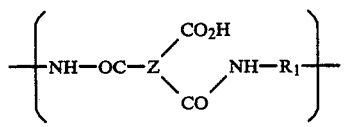

and units of:

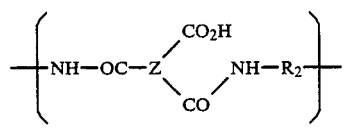

and optionally, units of:

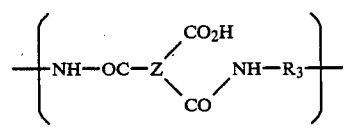

wherein the free carboxyl groups are ortho to one amide group, Z is an aromatic moiety containing 1 to 4 benzene rings or lower-alkyl-substituted benzene rings; $R_1$, $R_2$ and $R_3$ are different and are divalent, wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages, such as —O—, methylene, —CO—, —SO$_2$, —S—; for example —R —O—R —R —CH$_2$—R —, —R —CO—R'—, —R —SO$_2$—R —and —R'—S—R —. The terms polyamide-imide, polyamide-imide copolymer, and amide-imide copolymer are used interchangeably herein to refer to these copolymers.

These polyamic acids are capable of substantially complete imidization by heating, by which they form the polyamide-imide structure having, to a substantial extent, reoccurring units of:

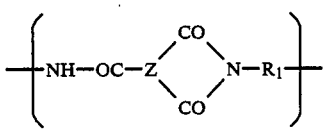

and units of:

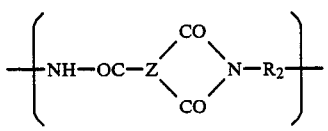

and optionally, units of:

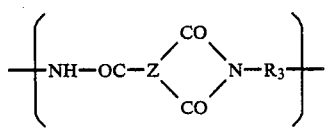

wherein one carbonyl group is meta to and one carbonyl group is para to each amide group and wherein Z, $R_1$, $R_2$ and $R_3$ are defined as above. Typical copolmers useful in this invention have up to about 50 percent imidization prior to heat treatment, typically about 10 to about 40 percent.

A mixture of diamines which contains two or more, preferably two or three, wholly- or largely-aromatic primary diamines can be used. More particularly, the diamines are wholly- or largely-aromatic primary diamines composed of two divalent aromatic moieties of from 6 to about 10 carbon atoms, each moiety containing one primary amine group, and the moieties linked directly or through, for example, a bridging of —O —, —S—, —SO$_2$—, —CO—, or methylene group. When the diamines are used they are preferably selected from the class composed of:

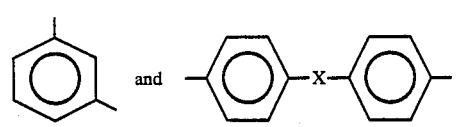

said X being —O—, —CH$_2$—, or —SO$_2$—group. Preferably, the mixture of aromatic primary diamines is composed of at least two diamines selected from the group consisting of meta-phenylenediamine, p,p'-oxy-bis(aniline), p,p '-sulfonylbis(aniline) and p,p'-methylenebis-(aniline). Preferably, the mixture of primary aromatic diamines contains meta-phenylenediamine and p,p -oxy-bis-(aniline). The aromatic nature of the diamines provides the excellent thermal properties of the homopolymer and copolymers while the primary amine groups permit the desired imide rings and amide linkages to be formed.

Alternatively, a polyamide-imide-phthalamide can be used. The polyamide-imide-phthalamide copolymers comprise reoccuring polyamide A units of:

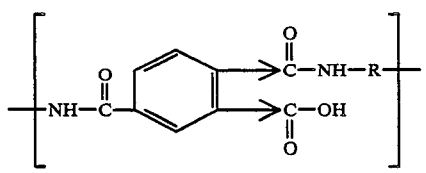

which are capable of undergoing imidization, and polyamide B units of:

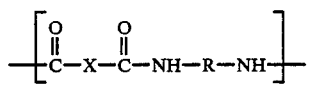

where the molar ratio of A units to B units is about 80 to about 20 to about 20 to about 80, preferably about 1 to 1, and wherein R is a divalent aromatic hydrocarbon radical of from about 6 to about 20 carbon atoms or two divalent hydrocarbons joined directly or by stable linkages selected from the group consisting of —O—, methylene, —CO—, —SO$_2$—, and wherein X is a divalent aromatic radical and denotes isomerization.

In the injection molded form the polyamide A units have been converted to the polyamide-imide A' units and the copolymer comprises recurring polyamide-imide A units of:

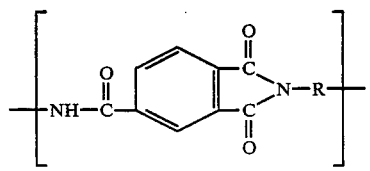

and polyamide B units of:

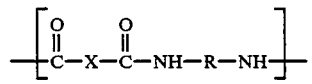

wherein the molar ratio of A to B units is about 80 to about 20 to about 20 to about 80, preferably about 1 to about 1, and wherein R and X are defined as above.

The copolymers of this invention are prepared from diamines and acyl halide derivatives of dicarboxylic acid such as isophthalic acid or terephathalic acid and an anhydride-containing substance. Useful acyl halide derivatives of dicarboxylic acid include:

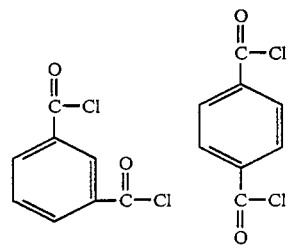

and related compounds. Suitably, the anhydride containing substance has one acyl halide group and one anhydride group in the aromatic ring. The preferred anhydride is the four acid chloride of trimellitic anhydride (4-TMAC).

Useful aromatic diamines include para- and meta-phenylenediamine, oxybis(aniline), thiobis(aniline), sulfonylbis(aniline), diaminobenzophenone, methylenebis-(aniline), benzidine, 1,5 diaminonaphthalene oxybis(-2methylaniline), thiobis(2-methylaniline), and the like. Examples of other useful aromatic primary diamines are set out in U.S. Pat. No. 3,494,890 and U.S. Pat. No. 4,016,140 both incorporated herein by reference. The preferred diamine is metaphenylenediamine.

The copolymers of this invention can be prepared by reacting a mixture of an acyl halide derivative of an aromatic tricarboxylic acid anhydride and acyl halide derivatives of aromatic dicarboxylic acids with aromatic diamines.

Other amide-imide copolymers of this invention are prepared by reacting an acyl halide derivative of an aromatic tricarboxylic acid anhydride with one or a mixture of largelyor wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7-13,000 as prepared) polymeric compounds, having in their molecule, units of:

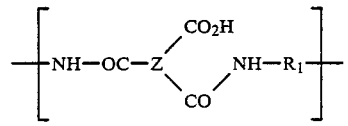

and units of:

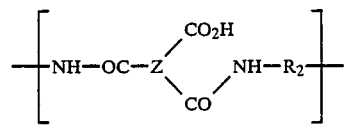

and, optionally, units of:

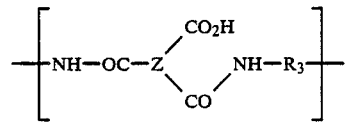

wherein the free carboxyl groups are ortho to one amide group, Z is an aromatic moiety containing 1 to 4 benzene rings or lower-alkyl-substituted benzene rings; $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from about 6 to about 10 carbon atoms, or two divalent aromatic hydrocarbon radicals each of from about 6 to about 10 carbon atoms joined directly or by stable linkages such as —O—, methylene, —CO—, —SO$_2$—, —S—; for example —R'—O—R'—, —R-

'—CH₂—R '—R—CO—R'—, —R'—SO₂—R'—and —R—S—R '—.

Said polyamides are capable of substantially complete imidization by heating, by which they form the polyamide-imide structure having, to a substantial extent, recurring units of:

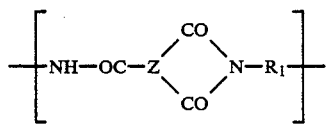

and units of:

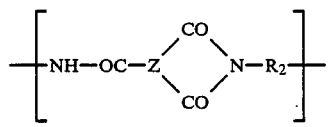

and, optionally, units of:

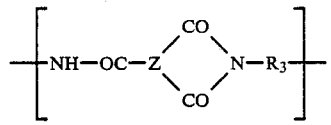

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

Polyamide-imide-phthalamide copolymers and the polyamide-imide polymers build their properties during the annealing step. The as molded properties are significantly below the annealed properties. To build polyamide-imide-phthalamide properties and polyamide-imide properties, parts are annealed at temperatures up to about 530° F., but preferably at about 500° F. Usually the copolymerization is carried out in the presence of a nitrogen-containing organic polar solvent, such as N-methyl-pyrrolidone, N,N-dimethylformamide and N,N-dimethylacetamide. The reaction should be carried out under substantially anhydrous conditions and at a temperature below about 150° C. Most advantageously, the reaction is carried out from about 20° to about 50° C.

The reaction time is not critical and depends primarily on the reaction temperature. It may vary from about 1 to about 24 hours, with about 2 to 4 hours at about 30° C. to 50° C. preferred for the nitrogen-containing solvents.

Cavity pressure measurements are used as quality control checks of polyamide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

It has been found that resins that have low cavity pressure process poorly. Low cavity pressures indicate a large pressure drop between injection and cavity pressures. This indicates higher resin viscosities. In the same manner high cavity pressures indicate less pressure change between injection and cavity pressures, suggesting lower resin viscosities.

Amide-imide copolymer viscosities had been measured by spiral flow determinations previous to the implementation of the cavity pressure procedure, see U.S. Pat. No. 4,224,214. Cavity pressure was selected over spiral flow because of its greater sensitivity. The cavity pressure test has been implemented as an amide-imide copolymer quality control procedure. Like spiral flow, cavity pressure is a test that can be done conveniently in a molder's shop.

The PAI resin is utilized for molding a variety of parts. Because of its stiff melt flow, high pressure and temperature are required for injection molding. The PAI resin is available as injection-moldable pellets. Grades include neat, graphite powder filled, and glass-reinforced and graphite-fiber reinforced resins.

The crystalline poly(aryletherketone)s which are suitable for use herein can be generically characterized as containing repeating units of one or more of the following formulae:

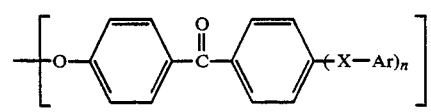 (I)

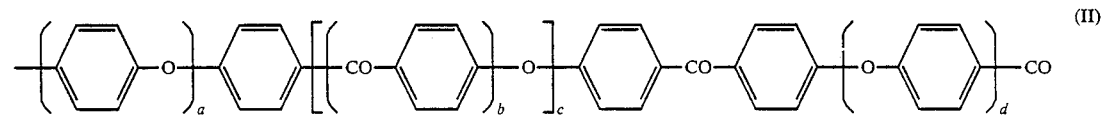 (II)

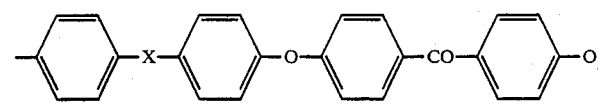 (III)

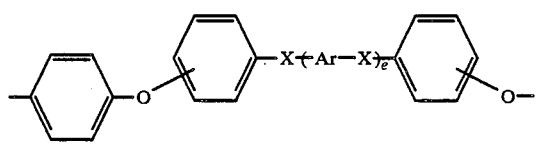 (IV)
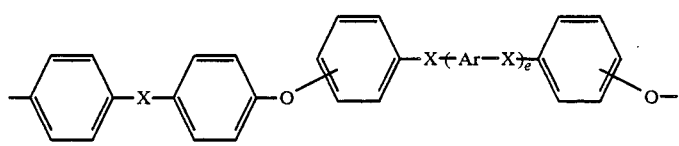 (V)
wherein Ar is independently a divalent aromatic radical selected from phenylene, biphenylene or naphthylene; X is independently —O—,
or a direct bond and n is an integer of from 0 to 3; b, c, d and e are 0 to 1, and a is an integer of 1 to 4, and preferably d is 0, when b is 1.
Preferred poly(aryletherketone)s include those having repeating units of the formula:
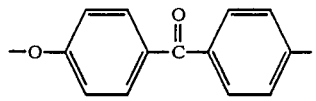
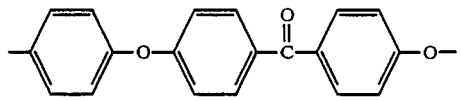
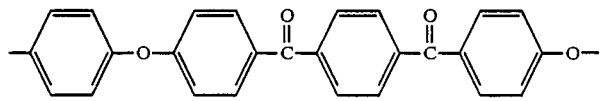
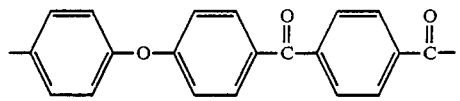
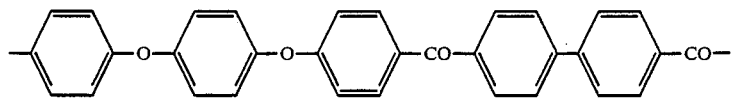
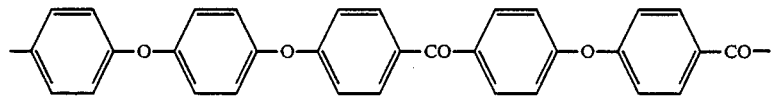
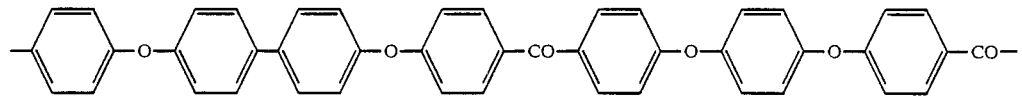
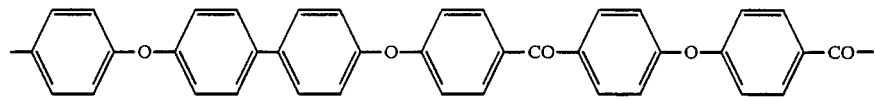

-continued

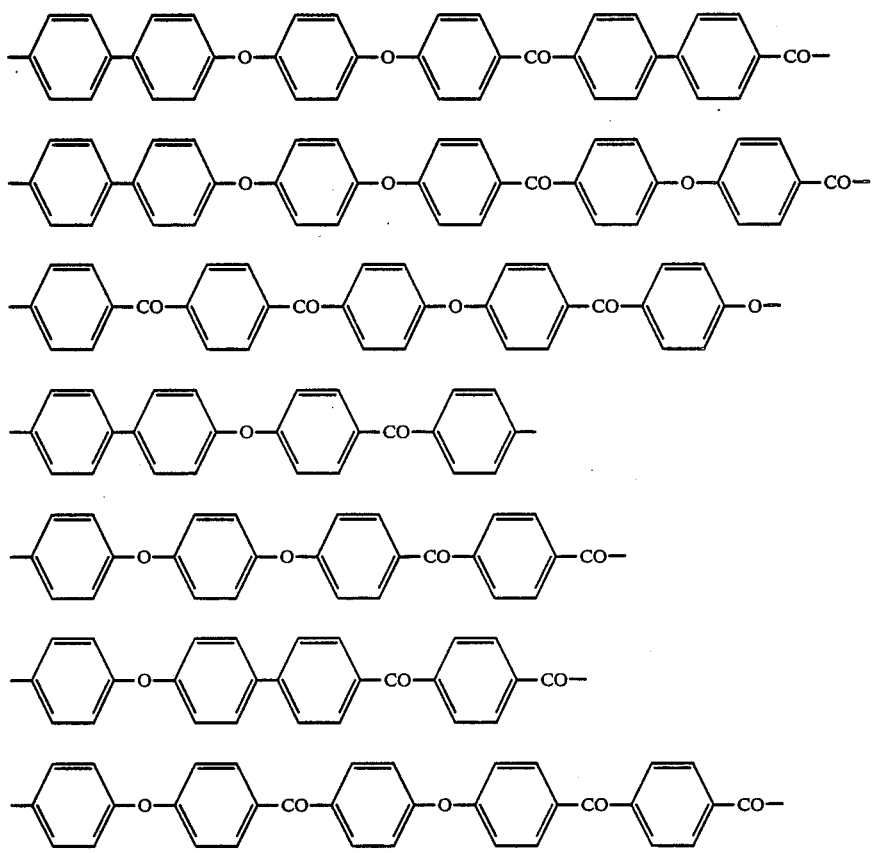

These poly(aryletherketone)s are prepared by methods well known in the art. One such method comprises heating a substantially equimolar mixture of at least one bisphenol and at least one dihalobenzoid compound or at least one halophenol compound. Preferred bisphenols in such a process include:
hydroquinone,
4,4'-dihydroxybenzophenone,
4,4'-dihydroxybiphenyl, and
4,4'-dihydroxydiphenyl ether.

Preferred dihalo and dihalobenzoid compounds include:
4-(4-chlorobenzoyl)phenol,
4,4'-difluorobenzophenone,
4,4'-dichlorobenzophenone,
4'-chloro-4'-fluorobenzophenone,

and

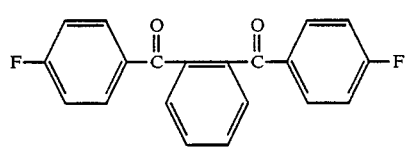

The poly(aryletherketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which, in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of the second alkali metal carbonate or bicarbonate having a higher atomic number than that of sodium, the amount of the second alkali metal carbonate or bicarbonate being such that there are 0.001 to 0.5 gram atoms of the alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryletherketone)s such as those containing repeating units of the formula:

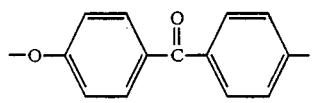

may be produced by Friedel-Craft reactions utilizing hydrogen fluoride-boron trifluoride catalysts as described, for example, in U.S. Pat. No. 3,953,400.

Additionally, poly(aryletherketones) of the following formula:

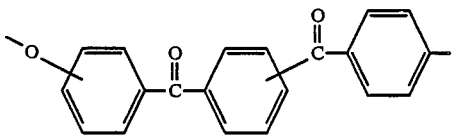

may be prepared by Friedel-Craft reactions using a boron fluoride-hydrogen fluoride catalyst as described in, for example, U.S. Pat. Nos. 3,441,538; 3,442,857 and 3,516,966.

The polyaryletherketones may also be prepared according to the process as described in, for example, U.S. Defensive Publication T 103,703 and U.S. Pat. No. 4,396,755. In such process, reactants such as (a) an aromatic monocarboxylic acid, (b) a mixture of at least one aromatic dicarboxylic acid, and (c) combination of (a) and (b) are reacted in the presence of a fluoroalkane sulphonic acid, particularly trifluoromethane sulphonic acid.

Additionally, poly(aryletherketone)s of the following formulas:

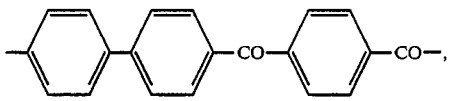

or

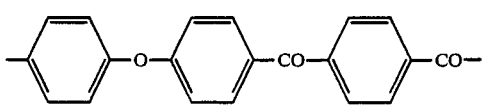

may also be prepared according to the process as described in, for example, U.S. Pat. No. 4,398,020. In such a process, (a) a mixture of substantially equimolar amounts of
(i) at least one aromatic diacyl halide of formula

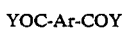

where —Ar— is a divalent aromatic radical, Y is halogen and COY is an aromatically bound acyl halide group, which diacyl halide is polymerizable with at least one aromatic compound of (a)(ii), and (ii) at least one aromatic compound of the formula
H—Ar'—H wherein —Ar'— is a divalent aromatic radical and H is an aromatically bound hydrogen atom, which compound is polymerizable with at least one diacyl halide of (a)(i)

(b) at least one aromatic monoacyl halide of formula

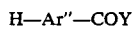

wherein —Ar"— is a divalent aromatic radical and H is an aromatically bound hydrogen atom, Y is halogen and COY is an aromatically bound acyl halide group, which monoacyl halide is self-polymerizable, and (c) a combination of (a) and (b) in the presence of a fluoroalkane sulphonic acid.

The term poly(aryletherketone) as used herein is meant to include homopolymers, copolymers, terpolymers, graft copolymers, block copolymers as described in, for example, U.S. Pat. No. 4,774,296 and the like.

For example, any one or more of the units (I) to (V) may be combined to form copolymers, etc.

The PEEK resin is marketed as neat or filled pellets for injection molding, as powder for coatings, or as preimpregnated fiber sheet and tapes. Uses include parts that are exposed to high temperature, radiation, or aggressive chemical environments. Aerospace and military uses are prominent.

The third essential component is any material, such as an inorganic hydrate, which liberates water of hydration at temperatures above the melt flow temperature (Tg) of the PAI, but below the melting point (Tm) of the PEEK. These hydrates may also liberate water at other temperatures but this has not been found to affect the moldability of the blend. Through use of this appropriate hydrate, it is possible to inhibit the apparent ketimine reaction during molding because the polycondensation reaction is an equilibrium process. Preferred hydrates are $ZnSO_4$, $Al(OH)_3$, $FeSO_4$, $Na_2B_4O_7$, and $Mg(NO_3)_2$. They can be used alone or in combination. Proposed hydrates and their decomposition temperatures for dehydration are shown in Table I. Note that the hydrates can lose water of hydration at temperatures below those reported in Table I. The loss of water is typically a gradual process and not an abrupt loss at a given temperature.

TABLE I

| Hydrate | Temp. of Dehydration (°C.) | Moles of Water Available | Chemical Formula |
| --- | --- | --- | --- |
| Aluminum Hydroxide | 300 | 1.5 | $Al(OH)_3$ |
| Iron II Sulfate | 300 | 7 | $FeSO_4.7H_2O$ |
| Borax (Sodium Tetraborate) | 320 | 10 | $NA_2B_4O_7.10H_2O$ |
| Lithium Pentaborate | 320–350 | 8 | $Li_2B_{10}O_{16}.8H_2O$ |
| Cuprous Hydroxide | 360 | ½ | $CuOH$ |
| Iridium Dihydroxide | 350 | 2 | $IrO_2.2H_2O$ |
| Lithium Iodide | 300 | 3 | $LiI.3H_2O$ |
| Magnesium Nitrate | 330 | 5 | $Mg(NO_3)_2.6H_2O$ |
| Potassium Pyrophosphate | 300 | 3 | $K_4P_2O_7.3H_2O$ |
| Zinc Sulfate | 280 | 7 | $ZnSO_4.7H_2O$ |

Data taken from CRC Handbook of Chemistry and Physics 44th and (56th Ed.)

The concentration of PAI or PAIP is equal to or less than about 90 wt%. The concentration of the polyaryletherketone is greater than about 10 wt%. The concentration of the inorganic hydrate is sufficient to liberate a minimum of about 250 ppm water, preferably between about 0.02 and 1.5 wt%.

The blends of this invention are prepared by conventional mixing methods. For example, the polymer components and inorganic hydrate are mixed with each other and any other optional ingredients in powder or granular form in an extruder. The mixture is extruded into strands. The strands are chopped into pellets. The pellets are molded into the desired article.

As mentioned previously, the molding conditions and molding equipment are those known by persons skilled in the art.

The blend can include mineral fillers such as carbonates, including chalk, calcite and dolomite. Silicates, including mica, talc, wollastonite, silicon dioxide, glass beads, glass powders, aluminum, clay, quartz, carbon powders MoS2 and the like. Also, reinforcing fibers such as fiberglass, carbon fibers and inorganic wiskers, and the like may be used. The blends may also include additives such as titanium dioxide, thermal stabilizers such as zinc oxide, ultraviolet light stabilizers, plasticizers, and the like, and other polymers that are thermally melt stable at the processing temperatures of PAI or PAIP. Such polymers include polyetherimides (G.E. ULTEM), polyethersulfone (I.C.I.Victrex), polyarylsulfone (Radel-APPI), polysulfone (UdelAPPI), amorphous and semi-crystalline polyamides, polyarylates, polyphenylene sulfide, polyphenylene oxide, etc.

EXAMPLES

The following examples serve to give specific illustrations of the practice of this invention but are not intended to limit the scope of this invention. They are exemplary, not exclusive.

EXAMPLE I

Polyamide-imide is prepared in the following way:

A 200 ml. round bottom 4-neck flask equipped with a nitrogen inlet tube, stirrer, thermometer, and solids addition funnel is charged with 99.9 parts by weight of (pbw) p,p'oxybis(aniline) (OBA), 23.1 pbw metaphenylenediamine (MPDA) and 604 pbw N-methylpyrrolidone (NMP). When solution at room temperature (70° F.) (22° C.) is complete, 142.5 pbw 4-trimellitoyl anhydride chloride (4-TMAC) having a percent purity of 99.5 percent as determined from chloride content and 6.8 pbw of trimellitic acid anhydride (TMA) is added over 2.5 hours while maintaining a solution temperature of between about (25°-35° C.) 77°-95° F. When addition is complete the solution is stirred for 3 hours during which time the solution viscosity increases to a Gardner-Holdt value of Z5+or about 110 poises.

Solid polymer is obtained by first pouring the viscous solution into twice its volume of distilled water in a Waring blender and then filtering. The filtrate is washed with 5 increments of 3000 pbw each of distilled water to remove hydrogen chloride that has been generated during reaction.

The solid is dried under a vacuum of 20 inches of mercury for 24 hours at 122° F(50° C). The above material is heated for 2 hours in an oven set at 450° F. (232° C.) to give the final polyamide-imide resin.

To determine the feasibility of this invention, pellet to pellet blends of PAI, PEEK and the appropriate inorganic hydrate are prepared. As an example, the PAI resin from above, 96.5 wt%, is dry blended with 3 wt% $TiO_2$ and 0.5 wt% PTFE and melt compounded into pellets. Then 500g of compounded pellets, PAI, 500g of PEEK pellets and 0.41g of zinc sulfate hydrate are mixed by tumbling for about one hour. The pellets are mixed with the zinc sulfate hydrate without any prior drying of the pellets. The pellet to pellet blend is then mixed by tumbling for about one hour and then injection molded into test specimens for evaluation of physical properties. The blend is then cured or annealed for 24 hours,. at 450° F. (232°°C.) followed by 24 hours at 500° F. (260° ) and 24 hours at 550° F. (288° C.). During the curing process, the PAI and PEEK polymers can graft with each other, forming the ketamine bond. The water chemically liberated in this process is removed during cure or is chemically absorbed by the hydrate precursor. The loss of water by the hydrate during molding is reversible. This reversible process may accelerate the curing process for the PAI and accelerate the ketimine grafting between the PAI and PEEK. U.S. Pat. No. 4,403,061, hereby incorporated by reference, illustrates the affect the hydrate precusor has on accelerating the cure process of the PAI. This apparent grafting, may account for the dramatic improvement of physical properties such as tensile strength, tensile elongation and flexual strength. Using this approach, several different inorganic hydrates are studied (Table II and Table III). The use of zinc sulfate hydrate yielded the most ductile material based upon elongation values observed during tensile strength evaluations. This is studied further in Example II by determining if it could be melt blended directly into the polymer.

TABLE II

Molding PAI/PEEK Blends Which Contain Inorganic Hydrates
Composition: 50% PAI[1] and 50% PEEK

| Hydrate used | Temperature of Dehydration (°C.) | Wt. % Hydrate | mole of Water Avalable | As Molded | Tensile Strength (psi), (% Elongation) | | |
|---|---|---|---|---|---|---|---|
| | | | | | 24 Hrs. @ 450° F. | 24 Hrs. @ 500° F. | 24 Hrs. @ 550° F. |
| $ZnSO_4$ | 280 | 0.04 | 7 | 9,427 (9.7) | 16,405 (24.4) | 19,331 (60.0) | 18,869 (61.3) |
| $Al(OH)_3$ | 300 | 0.08 | 1 | 8,460 (2.8) | 18,500 (10.9) | 18,479 (15.4) | 19,168 (21.1) |
| $FeSO_4$ | 300 | 0.06 | 5 | 8,728 (2.9) | 16,538 (8.2) | 18,623 (16.8) | 18,937 (18.8) |
| $Na_2B_4O_7$ | 320 | 0.04 | 10 | 8,899 (8.9) | 13,721 (5.1) | 18,800 (18.4) | 18,611 (54.0) |
| $Mg(NO_3)_2$ | 330 | 0.05 | 5 | 7,747 (7.9) | 14,204 (17.3) | 18,330 (17.8) | 16,931 (46.9) |
| PAI[1] | (As-Molded) | | | 15,000 (6.0) | | | |
| | (Cured[2]) | | | 27,800 (15.0) | | | |
| PEEK | | | | 13,000 (50.0) | | | |

[1]Contains 96.5 wt % PAI, 3 wt % $TiO_2$ and 0.5 wt % polytetrafluoroethylene PTFE
[2]Cured on a minimum cycle of 4.5 days; consisting of 24 hrs. at 300° F.(167° C.), 24 hrs. at 470° F.(242° C.) and 60 hrs. at 500° F.(260° C.)

TABLE III

MOLDING PAI/PEEK BLENDS WHICH CONTAIN INORGANIC HYDRATES
Composition: 50% PAI[1] and 50% PEEK

| Hydrate Used | Wt. % Hydrate | Moles of Water Available | Flexural Strength[2] ($10^3$ psi) @ 73° F. | Flexural Modulus[2] ($10^5$ psi) @ 73° F. | Heat Deflection Temperature (°F.) @ 264 psi |
|---|---|---|---|---|---|
| $ZnSO_4$ | 0.04 | 7 | 26.1 | 6.1 | 473 (245° C.) |
| $Al(OH)_3$ | 0.08 | 1 | 26.6 | 6.0 | 489 (254° C.) |
| $FeSO_4$ | 0.06 | 5 | 24.7 | 5.7 | 506 (281° C.) |
| $Na_2B_4O_7$ | 0.04 | 10 | 25.8 | 6.0 | 506 (286° C.) |
| $Mg(NO_3)_2$ | 0.05 | 5 | 20.9 | 4.6 | 497 (258° C.) |
| PAI[1] (Cured)[3] | | | 34.9 | 7.3 | 532 (278° C.) |
| PEEK | | | 24.7 | 5.3 | 320 (160° C.) |

[1]Contains 96.5 wt % PAI, 3 wt % $TiO_2$ and 0.5 wt % PTFE.
[2]After curing 1 day @ 450° F. (232° C.) and 1 day @ 500° F. (260° C.)
[3]Cured on a minimum cycle of 4.5 days, consisting of 24 hrs. at 300° F. (167° C.), 24 hrs. at 470° F. (242° C.) and 60 hrs. at 500° F. (260° C.)

EXAMPLE II

A preferred approach to processing the blend would be to first pelletize the blend prior to moldinq. This would insure better mixing. This is done by mixing 1135g of PAI (Example I) which contains 3 wt% $TiO_2$ and 0.5 wt% PTFE with 1135g of PEEK and 0.93g of zinc sulfate hydrate as described in Example I. The blend is then pelletized using a WernerPfleider ZSK-30 twin screw extruder. The barrel/setpoint temperature is between 400° (204° C.) and 610° F. (321° C.) the screw tip temperature is 730° F. (388° C. The blend is then injection molded into test specimens with a general purpose screw which has a 2.2 to 1 compression ratio and a ratio of length to diameter of 20/1, and shutoff nozzle using an 80 ton Engel injection molding press. The process temperatures are a nozzle temperature of 680° F.(360° C.), front zone of 680° F. (360° C.) middle zone of 620° F. (332° C.) and back zone of 580° F. (304° C.) The mold temperature is 350° F. (177° C.). No precautions are taken to protect the blend from moisture uptake prior to molding. However, a shutoff nozzle is used to provide a positive melt seal. This same practice is followed in Example I. Material compounded but not pelletized is also run for comparison purposes. The physical properties of the blend are given in Table IV. As before, curing results in a significant improvement in properties as noted by significant increases in tensile strength, tensile elongation, flexual strength, heat deflection temperature and impact strength. Curing also resulted in an unexpected synergistic improvement in the notched IZOD impact strength as compared to the neat polymer components.

TABLE IV

Properties of Compounded PAI/PEEK Blends Inhibited With Hydrous Zinc Sulfate
Composition: 50 Wt. % PAI[1], 50 Wt. % PEEK, 0.04 Wt. % $ZnSO_4.H_2O$

| Composition | Method of Blending | Condition | Tensile Strength, psi (% Elongation) | Flexural Strength (psi) | Flexural Modulus (psi) | Heat Deflection Temp., °F. @ 264 psi | Izod Impact Notch | Izod Impact No-Notch |
|---|---|---|---|---|---|---|---|---|
| PAI/PEEK | Pellet-to Pellet | As Molded | 12,034 (4.4) | 19,317 | 595,805 | 380 (193° C.) | 0.62 | 3.62 |
| | | Cured[2] | 20,077 (23.4) | 27,045 | 626,219 | 477 (247° C.) | 5.66 | 34.33 |
| PAI/PEEK | Compounded | As Molded | 8,701 (3.1) | 13,606 | 576,827 | 354 (184° C.) | 0.37 | 2.1 |
| | | Cured[2] | 18,561 (32.1) | 26,087 | 596,574 | 482 (250° C.) | 4.61 | 55.83 |
| PAI | Compounded | Cured[3] | 27,800 (15.0) | 34,900 | 730,000 | 532 (278° C.) | 2.7 | 20.0 |
| PEEK | — | — | 13,300 (4.9 @ Yield) (50.0 @ Break) | 24,700 | 530,800 | 320 (160° C.) | 1.55 | No Break |

[1]Contains 96.5 wt % PAI, 3.0 wt % $TiO_2$ and 0.5 wt % PTFE
[2]Cured 24 Hours at 450° F. (232° C.) and 24 Hours at 500° F. (260° C.)
[3]Cured for a minimum of 4.5 days; consisting of 24 hrs. at 300° F. (149° C.), 24 hrs. at 470° F. (242° C.) and 60 hrs. at 500° F. (260° C.)

EXAMPLE III

The following experimentation is conducted to consider the effect of varying the compositional range of PAIPEEK blends. Pellet to pellet blends of PAI and PEEK of various ratios are prepared and zinc sulfate hydrate is added to the blends similar to Example 1. As an example, 75 g of PAI (Example I) pellets which contain 3.0 wt% $TiO_2$ and 0.5 wt% PTFE, 1425 g of PEEK pellets and 0.5 g of zinc sulfate hydrate are mixed by tumbling for about one hour and then injection molded into test specimens for evaluation of physical properties. An Engel injection molding press is used with mixing provided by a general purpose screw. A shut off nozzle is used to maintain a melt seal. Further details about the experimentation are included in Tables V and VI:

TABLE V

The Effects of Composition Upon PAI[1] - PEEK BLENDS
As Molded Properties
Contains 333 ppm $ZnSO_4 \cdot H_2O$

| Wt. % PAI[1] Wt. % PEEK | Tensile Properties | | | | Flexural Properties | | | HDT, F 264 psi |
|---|---|---|---|---|---|---|---|---|
| | Tensile Strength (psi) | | % Elongation | | Flexural Strength (psi) | Flexural Modulus, psi | % Max Strain | |
| | Yield | Break | Yield | Break | | | | |
| 5/95 | 13,810 | 12,110 | 7.5 | 49.4 | 22,850 | 557,800 | 10.6 | 313 (156° C.) |
| 10/90 | 13,910 | 12,550 | 7.6 | 36.2 | 22,200 | 574,100 | 10.4 | 312 (156° C.) |
| 20/80 | 14,550 | 13,375 | 8.9 | 31.6 | 23,190 | 569,300 | 9.4 | 321 (160° C.) |
| 30/70 | — | 11,700 | — | 3.4 | 22,500 | 584,780 | 5.5 | 347 (175° C.) |
| 40/60 | — | 11,380 | — | 3.3 | 19,250 | 549,750 | 4.0 | 359 (182° C.) |
| 50/50 | — | 9,640 | — | 2.6 | 17,640 | 554,700 | 3.5 | 375 (191° C.) |
| 60/40 | — | 12,590 | — | 3.9 | 21,170 | 556,850 | 5.2 | 341 (191° C.) |
| 70/30 | — | 12,450 | — | 3.7 | 22,350 | 582,760 | 4.9 | 393 (201° C.) |
| 90/10 | — | 5,530 | — | 1.5 | 14,230 | 637,800 | 2.4 | 430 (221° C.) |
| 95/5 | — | 7,770 | — | 1.9 | 14,390 | 667,580 | 2.3 | 430 (221° C.) |

[1]Contains 96.5 wt % PAI, 3.0 wt % $TiO_2$ and 0.5 wt % PTFE.

TABLE VI

The Effects of Composition Upon PAI[1] - PEEK Blends
Cured[2] Properties
Contains 333 ppm $ZnSO_4 \cdot H_2O$

| Wt. % PAI[1] Wt. % PEEK | Tensile Properties | | | | Flexural Properties | | | HDT, F 264 psi | |
|---|---|---|---|---|---|---|---|---|---|
| | Tensile Strength (psi) | | % Elongation | | Flexural Strength (psi) | Flexural Modulus, psi | % Max Strain | | |
| | Yield | Break | Yield | Break | | | | | |
| 5/95 | 15,890 | 14,610 | 6.7 | 16.8 | 25,160 | 577,640 | 12.2 | 383 | (195° C.) |
| 10/90 | 15,870 | 15,020[3] | 7.0 | 21.9 | 24,080 | 591,920 | 6.5 | 469 | (243° C.) |
| 20/80 | 16,810 | 16,535[3] | 11.0 | 20.9 | 25,880 | 598,760 | 10.6 | 490 | (255° C.) |
| 30/70 | — | 18,211[4] | — | 21.3 | 25,880 | 586,630 | 10.4 | 488 | (254° C.) |
| 40/60 | — | 15,280[5] | — | 4.8 | 26,230 | 595,110 | 11.5 | 493 | (257° C.) |
| 50/50 | — | 17,400 | — | 14.3 | 26,300 | 589,380 | 10.0 | 495 | (257° C.) |
| 60/40 | — | 19,670 | — | 16.9 | 25,840 | 586,920 | 10.2 | 496 | (258° C.) |
| 70/30 | — | 18,110 | — | 17.6 | 26,520 | 598,450 | 9.8 | — | (258° C.) |
| 90/10 | — | 17,320 | — | 5.2 | 28,730 | 645,330 | 6.9 | 501 | (261° C.) |
| 95/5 | — | 15,190 | — | 4.3 | 26,330 | 639,740 | 5.4 | 504 | (263° C.) |

[1]Contains 96.5 wt % PAI, 3.0 wt % $TiO_2$ and 0.5 wt % PTFE.
[2]Cured for 24 hrs at 450° F. (232° C.) and 24 hrs. at 500° F. (260° C.)
[3]Several broke without yielding, possibly due to incomplete mixing.
[4]Several broke at lower % elongation, possibly due to incomplete mixing.
[5]These results may indicate incomplete mixing; one sample had a T.S. or 18,710 with 18.5% elongation.

The "as molded" properties in Table V indicate several trends. For example, as the PAI component exceeds 20%, the blends no longer yield. This transition is observed when the maximum elongation is measured during the tensile properties. At 20% or less PAI, the blend is very tough. Molded toughness is important during the molding of parts such as connectors. When the PAI component exceeds 90%, the blend becomes very brittle as reflected in strain during flex testing and tensile testing. At 70% PAI the properties are very similar to the other blends ranging from 30 to 70 wt% PAI. The heat deflection temperature of the "as molded" specimens is lowered as the PEEK component is increased. The cured properties in Table VI also suggest that curing improves the properties as observed in increased tensile strength, and elongation, flexural strength and maximum strain.

It should be noted that at a composition of 80% PEEK, 20% PAI, a very ductile blend is obtained which has a substantial HDT as compared to neat PEEK. Overall strength properties are also superior to PEEK. It should be further noted that the properties of the blend can be tailored by altering the ratio between PAI and PEEK in the blend. This allows one to obtain the most desireable properties for a specific application.

EXAMPLE IV

Based upon the physical properties in Tables V and VI, a 67.55 wt% PAI (EXAMPLE I), 2.1 wt% $TiO_2$, 0.3 wt% PTFE, and 30 wt.% PEEK blend is studied further in order to select the minimum level of zinc sulfate hydrate necessary to stablize the blend during injection molding. Of concern is the melt stability during interruption of the molding cycle. Increasing levels of zinc sulfate hydrate is mixed into the PAI-PEEK blend. The blend is then pelletized using a Warner-Pfleider ZSK-30 twin screw extruder. Immediately prior to molding the blends are dried at 300° F. (149° C.) in a desiccant oven to remove water absorbed in the polymer components of the blend. Moisture in PAI or PAIP has a very significant effect upon the properties and flow of the polymer. Therefore special care is taken to insure that the samples were properly dried. This drying procedure was used before making cavity pressure measurements. The melt viscosity of the blend is monitored by measuring the cavity pressure in the mold during injection molding. After lining out and determining the initial cavity pressure, the injection molding machine is shut down with polymer in the barrel for intervals of 5 min. and 15 min. After shutdown for the desired interval, molding is restarted and the cavity pressure is measured. At 660° F. (349° C.), a typical molding temperature for the blend, a cavity pressure is measured for the blend, even without any zinc sulfate hydrate being present in the blend. However, after shutting down for only 5 min., the cavity pressure is zero due to loss of flow of resin into the cavity. Increasing the zinc sulfate hydrate level to 800 ppm did not improve moldability. However, increasing the zinc sulfate hydrate level to 1,600 ppm improved the melt stability of the blend as reflected in the higher initial cavity pressure and an ability to restart molding after shutdown. Even under these conditions, a decline in the cavity pressure is observed as a function of residence time in the barrel. By further increasing the level of zinc sulfate hydrate in the blend to 2,400 ppm, the melt viscosity of the blend is stabilized as reflected in the cavity pressure measurements after shutdown for 5 to 15 minutes. The use of zinc sulfate hydrate at this level allows one to properly dry the blend prior to molding and yet maintain material in the barrel for a significant time in order to mold parts. Table VII presents the results along with physical properties. Note that the tensile elongation after cure improves with increasing levels of zinc sulfate hydrate. Furthermore, note that the blend has a good flexural modulus.

have a wide range of molecular weight without affecting the properties of the resulting blend.

EXAMPLE VI

Polyamide-imide phthalamide is prepared in the following way:

A 10 gallon glass-lined Pfaudler kettle equipped with a water-cooled jacket and nitrogen inlet is charged with 9.87 lbs. of m-phenylenediamine (MPDA), 0.35 lbs. of trimellitic anhydride (TMA) and 59.2 lbs. of N-methylpyrrolidone (NMP). After solution had occurred under a nitrogen purge an intimate blend of 9.52 lbs. of 4-trimellitoyl anhydride (4-TMAC) chloride and 9.17 lbs. of isophthaloyl dichloride (IPCl$_2$) is added over 2.5 hrs. keeping the temperature below 35° C. The resulting viscous solution is brought to 50° C. When the Gardner viscosity has reached a Z3 viscosity the solution is precipitated by passage through a Fitzpatrick comminuting mill. The polymer product is washed five times with deionized water followed by air-drying on a filter for 3 days. The product is then brought to a solids content of 98.3 percent by heating in a forced air oven for 2 hours at 470° F. (242° C.).

Experimentation is conducted about processing and

TABLE VII

Minimum Level of ZnSO$_4$.H$_2$O for Melt Stability of a Blend of PAI-PEEK[1]

| Level of ZnSO$_4$.2O (ppm) | Melt Temp. F. | Cavity Pressure, psi | | | Tensile Strength, psi | | Flexural Strength, psi | | Flexural Modulus, psi | | % Max Strain | |
|---|---|---|---|---|---|---|---|---|---|---|---|---|
| | | Initial | 5 Min. | 15 Min | As Molded | (%) Elongation Cured[2] | As Molded | Cured[2] | As Molded | Cured[2] | As Molded | Cured |
| 0 | 660 | 8,000 | 0 | 0 | 11,300 (2.9) | 20,100 (7.6) | 16,420 | 27,620 | 643,735 | 647,880 | 2.8 | 7.4 |
| 800 | 660 | 7,300 | 0 | 0 | 12,200 (3.3) | 20,200 (8.0) | 16,430 | 27,190 | 630,160 | 614,260 | 3.0 | 7.3 |
| 1,600 | 660 | 10,300 | 7,200 | 4,300 | 11,200 (3.0) | 20,600 (8.2) | 16,110 | 27,670 | 636,555 | 644,315 | 2.7 | 6.9 |
| 2,400 | 660 | 10,800 | 9,500 | 9,700 | 12,300 (3.3) | 21,700 (12.4) | 17,975 | 29,570 | 657,285 | 677,550 | 3.0 | 10.0 |

[1]67.55 wt. % PAI Powder, 2.1 wt. % TiO$_2$, 0.35 wt. % PTFE and 30 wt. % PEEK 450 Powder - Dried 5 hrs. prior to molding.
[2]Cured for 24 hours at 450° F. (232° C.) and 24 hours at 500° F. (260° C.).

EXAMPLE V

Experimentation is conducted about processing and properties of PAI-PAEK (polyarletherketone) blends. Kadel, comprising poly(aryletheretherketone) (PAEEK), is examined as a component at 30 wt% with PAI (Example I) in a blend with 2,400 ppm of zinc sulfate hydrate. PAI powder, TiO$_2$ and PTFE is mixed with PAEEK polymer and zinc sulfate hydrate followed by pelletizing. The blends are then stored at 50% relative humidity for several days, then dried for 5 hours at 300° F. (149° C.) immediately prior to molding to remove casual water. Several different melt flow samples are studied. Typically the higher the melt flow, the lower the molecular weight. Information about the experimentation is presented in Table IX. In general, the higher the melt flow of the PAEEK component, the higher the cavity pressure or the lower the melt viscosity. When the PAEEK component's melt flow is 60, the blend's as molded tensile strength is low. However, after cure the blend exhibits an excellent balance of properties. Between a melt flow of 6 to 23, the properties are all very similar and comparable to a PAI-PEEK blend with the same level of inorganic hydrate. This indicates that PEEK can be replaced with PAEEK. Furthermore, the results indicate that the PAEEK can properties of polyamide-imide-phthalamide-PEEK blends. Amoco's polyamide-imide is replaced with polyamide-imide-phthalamide, as sold by Amoco Performance Products Inc., as a component at 69 wt% with 30 wt% PEEK in a blend and with increasing levels of zinc sulfate hydrate. Also 1% Teflon is added to the blend to aid in mold release during molding. PAIP powder and PTFE is mixed with PEEK powder and zinc sulfate hydrate followed by pelletizing. The blends are then stored at 50% relative humidity for several days, then dried for 5 hours at 300° F. (149° C.) immediately prior to molding to remove water absorbed by the polymer components. The neat polyamide-imide-phthalamide resin is extremely brittle. Because of this, samples for testing of all physical properties are not collected. The addition of zinc sulfate hydrate to the blend of 30% PEEK and 69% PAIP is observed to significantly improve both the molded tensile strength and flexural strength of the blend as compared to either neat polymer or the blend without hydrate (Table IX). The impact strength of the molded parts was also improved. This is important during molding. Curing resulted in further improvements in strength.

EXAMPLE VII

Experimentation is conducted about processing and properties of polyamide-imide-PEEK blends which are reinforced with either fiber glass or graphite fibers. Polyamide-imide (Example I) is compounded with PEEK, Teflon, and either graphite fibers or fiber glass in the compositions illustrated in Table X. After pelletizing, the blends are stored for several days at 50% relative humidity. They are then dried for 5 hours at 300° F. (149° C.) immediately prior to molding to remove water absorbed by the polymer components.

Samples are molded for testing and the cavity pressure is measured during molding. The addition of zinc sulfate hydrate to the blends improves the flow during molding as indicated by the higher cavity pressure. The presence of zinc sulfate hydrate in the blends also is observed to significantly improve the tensile strength, tensile elongation and flexural strength for the as molded part. Furthermore, cured properties such as tensile strength, tensile elongation and flexural strength are significantly superior in the blends which contain zinc sulfate hydrate to those which do not contain hydrate. This further illustrates the beneficial effect that the use of hydrates can have upon the molding and properties of PAI-PEEK blends.

TABLE VIII

The Effects of PAEEK Melt Flow Upon the Processing and Properties of PAI-PAEEK Blends[1]

| adel Melt Flow | Melt Temp., F. | Cavity Pressure, psi | Tensile Strength, psi (% Elongation) | | Flex Properties | | | | | |
|---|---|---|---|---|---|---|---|---|---|---|
| | | | | | Flexual Strength, psi | | Flexural Modulus, psi | | % Max Strain | |
| | | | As Molded | Cured[2] | As Molded | Cured | As Molded | Cured | As Molded | Cured |
| 60 | 660 (349° C.) | 13,400 | 6,300(2.3) | 18,800(7.1) | 17,830 | 30,490 | 668,220 | 687,660 | 2.9 | 10.1 |
| 23 | 660 | 8,550 | 11,900(3.1) | 22,000(11.8) | 17,510 | 29,770 | 637,285 | 680,170 | 3.0 | 10.0 |
| 15 | 660 | 10,400 | 12,200(3.2) | 22,300(11.7) | 17,520 | 29,220 | 650,930 | 670,020 | 2.9 | 10.1 |
| 6 | 660 | 9,500 | 11,100(3.2) | 22,100(14.7) | 16,300 | 28,780 | 637,080 | 648,710 | 2.7 | 10.1 |

[1]67.55 wt. % PAI, 2.1 wt. % TiO$_2$, 0.35 wt. % PTFE and 30% PAEEK containing 2,400 ppm ZnSO$_4$.H$_2$O. Dried 5 hrs at 300° F. prior to molding.
[2]Cured for 24 hrs at 450° F. (232° C.) and 24 hrs at 500° F. (260° C.).

TABLE IX

Minimum Level of ZnSO$_4$.H$_2$O for Molding a Blend[1] of PAIP-PEEK

[1]Contains 69% PAIP, 30% PEEK and 1% PTFE. To this was added increasing levels of zinc sulfate hydrate.

| Level of ZnSO$_4$.H$_2$O, ppm | Cavity Pressure | Condition | Tensile Strength, psi (% Elongation) | Flexural Strength, psi | Flexural Modulus, psi | HDT, °F. @ 264 psi | Izod Impact | |
|---|---|---|---|---|---|---|---|---|
| | | | | | | | Notch | No Notch |
| 0 | 13,777 | As Molded | 8,400 (2.3) | 15,430 | 677,480 | 422 (217°C.) | 0.3 | 2.3 |
| | | Cured | 20,620 (19.1) | 30,940 | 644,840 | 516 (269° C.) | 1.3 | 42.7 |
| 763 | 13,773 | As Molded | 10,800 (3.3) | 19,490 | 661,590 | 438 (226° C.) | 0.9 | 3.4 |
| | | Cured | 21.140 (15.4) | 30,620 | 660,160 | 521 (272° C.) | 1.4 | 28.7 |
| 1524 | 11,998 | As Molded | 14,420 (5.2) | 22.130 | 672,840 | 429 (221° C.) | 1.2 | 4.0 |
| | | Cured 2 | 21,780 (15.2) | 30,440 | 658,860 | 522 (272° C.) | 1.2 | 27.2 |
| PAIP[3] | 14,477 | As Molded | 3,268 (0.8) | — | — | — | — | — |
| | | Cured[2] | 18,980 (7.3) | 28,960 | 621,830 | — | — | — |
| PEEK | — | Lit. | 13,300 (50) | 24,700 | 530,800 | 320 (160° C.) | 1.55 | No Break |

[2]Cured for 24 hrs. at 450° F., (232° C.) 24 hrs at 500° F. (260° C.) and 24 hours at 550° F. (288° C.).
[3]Contains 99% PAIP and 1% PTFE.

TABLE X

The Effects of Reinforcing Materials Upon the Properties of PAI-PEEK Blends

| Composition | Cavity Pressure, psi | Tensile strength, psi (% Elongation) | | Flexural Properties | | | | HDT, °F. @ 264 psi Cured |
|---|---|---|---|---|---|---|---|---|
| | | | | Strength, psi | | Modulus | | |
| | | As Molded | Cured[1] | As Molded | Cured[1] | As Molded | Cured[1] | |
| 47% PAI, 20% PEEK 32% Graphite Fiber 1% PTFE | 8,344 | 17,020(2.1) | 25,680(3.5) | 27,670 | 38,410 | 2.34 × 10$^6$ | 2.22 × 10$^6$ | — |
| 47% PAI, 20% PEEK 32% Graphite Fiber 1% PTFE, 0.25% ZnSO$_4$.H$_2$O | 9,454 | 17,730(2.4) | 29,060(4.1) | 30,250 | 47,080 | 2.43 × 10$^6$ | 2.46 × 10$^6$ | 530 (277° C.) |
| 48% PAI, 21% PEEK 30% Fiber Glass 1% PTFE | 9,704 | 16,150(2.2) | 21,980(3.3) | 26,350 | 37,280 | 1.55 × 10$^6$ | 1.55 × 10$^6$ | — |
| 48% PAI, 21% PEEK 30% Fiber Glass 1% PTFE, 0.25% ZnSO$_4$.H$_2$O | 10,695 | 16,830(2.9) | 25,440(4.6) | 28,710 | 38,010 | 1.48 × 10$^6$ | 1.46 × 10$^6$ | 528 (276° C.) |
| 41% PAI, 18% PEEK 40% Fiber Glass 1% PTFE | 9,401 | 16,950(2.4) | 21,890(2.8) | 28,860 | 39,700 | 1.87 × 10$^6$ | 1.83 × 10$^6$ | — |
| 41% PAI, 18% PEEK 40% Fiber Glass 1% PTFE, 0.25% | 9,776 | 18,820(3.0) | 25,820(4.2) | 30,270 | 40,740 | 1.68 × 10$^6$ | 1.67 × 10$^6$ | 526 (275° C.) |

TABLE X-continued

| | | The Effects of Reinforcing Materials Upon the Properties of PAI-PEEK Blends | | | | | | |
|---|---|---|---|---|---|---|---|---|
| | | Tensile strength, psi | | Flexural Properties | | | | HDT, °F. |
| | Cavity | (% Elongation) | | Strength, psi | | Modulus | | @ 264 psi |
| Composition | Pressure, psi | As Molded | Cured[1] | As Molded | Cured[1] | As Molded | Cured[1] | Cured |
| $ZnSO_4.H_2O$ | | | | | | | | |

[1] Cured for 24 hours at 450° F. (232° C.) and 24 hours at 500° F. (260° C.).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. Above references are hereby incorporated by reference.

We claim:

1. A process for stabilizing the melt viscosity of a polymer blend comprising mixing polyamide-imide and polyaryletherketone with a hydrate which liberates water of hydration at temperatures above melt flow temperatures of polyamide-imide, but below melting points for polyaryletherketone and recovering a product.

2. The process according to claim 1, wherein the polyaryletherketone comprises polyetherketone or polyetheretherketone.

3. The process according to claim 1, wherein the product is injection molded.

4. The process according to claim 1, wherein the hydrate is an inorganic hydrate.

5. The process according to claim 4, wherein the inorganic hydrate is $ZnSO_4.7H_2O$ $FeSO_4.7H_2O$, $Na_2B_4O_7.10H_2O$, or $Mg(NO_3)_2.6H_2O$.

6. The process according to claim 4, wherein the blend contains a concentration of polyamide-imide equal to or less than about 90 wt%, a concentration of polyaryletherketone greater than about 10 wt%, and a concentration of inorganic hydrate sufficient to liberate a minimum of 250 ppm water.

7. The process according to claim 6, wherein the concentration of polyamide-imide is equal to or less than about 20 wt% and the concentration of polyaryletherketone is equal or greater than about 80 wt%.

8. The process according to claim 1, wherein the concentration of the hydrate is sufficient to liberate between about 0.02 and 1.5 wt. percent water.

9. The process according to claim 1, wherein the polymer blend includes filler material.

10. A polymer compound comprising polyamide-imide polyaryletherketone and hydrate which liberates water of hydration at temperatures above melt flow temperatures of polyamide-imide, but below melting points for polyaryletherketone.

11. The polymer compound of claim 10, wherein the hydrate is an inorganic hydrate.

12. The polymer compound according to claim 11, wherein the inorganic hydrate is $ZnSO_4.7HO_2O$, $Al(OH)_3$, $FeSO_4.7H_2O$, $Na_2B_4O_7.10H_2O$, or $Mg(NO_3)_2.6H_2O$.

13. The polymer compound according to claim 10, wherein the blend contains a concentration of polyamide-imide equal to or less than 90 wt%, a concentration of polyaryletherketone greater than about 10 wt% and a concentration of inorganic hydrate sufficient to liberate a minimum of 250 ppm water.

14. The polymer compound according to claim 13, wherein the concentration of polyamide-imide is equal to or less than about 20 wt% and the concentration of polyaryletherketone is equal to or greater than about 80 wt%.

15. The polymer compound according to claim 10, wherein the polyaryletherketone comprising polyetherketone or polyetheretherketone.

16. The polymer compound according to claim 10, wherein the polymer compound includes filler material.

17. The polymer compound according to claim 11, wherein the concentration of the hydrate is sufficient to liberate between about 0.02 and 1.5 wt. percent water.

18. A molded article comprising polyamide-imide polyaryletherketone and hydrate which liberates water of hydration at temperatures above melt flow temperatures of polyamide-imide but below melting points for polyaryletherketone.

19. The molded article according to claim 18, wherein the polyaryletherketone comprises polyetherketone or polyetheretherketone.

20. The molded article according to claim 18, wherein the hydrate is an inorganic hydrate.

21. The molded article according to claim 20, wherein the inorganic hydrate is $ZnSO_4.7H_2O$ $Al(OH)_3$, $FeSO_4.7H_2O$, $Na_2B_4O_7.10H_2O$ or $Mg(NO_3)_2.6H_2O$.

22. The molded article according to claim 18, wherein the molded article includes filler material.

23. The molded article according to claim 20, wherein the concentration of the hydrate is sufficient to liberate between about 0.02 and 1.5 wt. percent water.

24. The process according to claim 1, wherein the polyamideimide comprises a polyamide-imide-phthalamide.

25. The process according to claim 1, wherein the polyamideimide consists essentially of the reaction product of trimellitoyl halide, meta-phenylenediamine and p,p'oxy-bis-(aniline).

26. The process according to claim 1 where the hydrate comprises $Al(OH)_3$.

27. The polymer compound according to claim 10, wherein the polyamide-imide comprises a polyamide-imide-phthalamide.

28. The polymer compound according to claim 10, wherein the polyamide-imide consists essentially of the reaction product of trimellitoyl halide, meta-phenylenediamine and p,p'-oxy-bis(aniline).

29. The molded article according to claim 18, wherein the polyamide-imide comprises a polyamide-imide-phthalamide.

30. The molded article according to claim 18, wherein the polyamide-imide consists essentially of the reaction product of trimellitoyl halide, meta-phenylenediamine and p,p'-oxy-bis(aniline).

* * * * *